United States Patent [19]

Chambers

[11] Patent Number: 4,751,985
[45] Date of Patent: Jun. 21, 1988

[54] COMPACT BRAKE PISTON-RETURN MECHANISM

[75] Inventor: Warren D. Chambers, South Bend, Ind.

[73] Assignee: Allied Corporation, Morristown, N.J.

[21] Appl. No.: 907,354

[22] Filed: Sep. 15, 1986

[51] Int. Cl.$^4$ .................. F16D 55/02; F16D 65/38; F16D 13/60

[52] U.S. Cl. ................ 188/71.8; 188/196 P; 192/111 A

[58] Field of Search .......... 188/374, 375, 71.8, 188/196 R, 196 P, 372, 376; 244/110 A, 111; 192/111 A; 92/13.1, 51, 52, 130 R, 131; 277/140, 146, 164, 165, 168, 205

[56] References Cited

U.S. PATENT DOCUMENTS

| | | | |
|---|---|---|---|
| 2,888,109 | 5/1959 | Tankersley | 188/196 |
| 3,338,353 | 8/1967 | Lucien | 188/196 |
| 3,581,849 | 6/1971 | Landgraf | 188/71.8 |
| 3,729,072 | 4/1973 | Borkowski | 188/196 P |
| 3,811,366 | 5/1974 | Angelis et al. | 91/130 |
| 3,887,047 | 6/1975 | Harnish et al. | 188/196 R |
| 4,006,669 | 2/1977 | Price | 92/13.1 |
| 4,108,447 | 8/1978 | Scholin | 277/164 X |
| 4,180,147 | 12/1979 | Tjarksen et al. | 188/71.8 |
| 4,503,950 | 3/1985 | Anderson | 188/196 R |
| 4,529,068 | 7/1985 | Gallo | 188/71.8 |

Primary Examiner—Andres Kashnikow
Assistant Examiner—Robert J. Oberleitner
Attorney, Agent, or Firm—Larry J. Palguta; Ken C. Decker

[57] ABSTRACT

The compact brake piston-return mechanism (10) comprises a housing (22) having a bore (40) with a longitudinal sleeve (50) received fixedly in said bore (40). The sleeve (50) has a through opening (56) receiving therein a piston (60) which extends exteriorly of the through opening (56) to an enlarged diameter portion (69) for engaging a brake stack (32, 35, 36). The piston (60) has an interior opening (66) in which is disposed a deformable member (80) connected by means of a ring (70) with the piston (60). A deforming member (90) is disposed within said deformable member (80), deforming member (90) extending axially through an aperture (63) at an end (62) of the piston (60) disposed within said bore (40). The deforming member (90) includes a radially extending member (94) which has an axially extending portion (95) that encircles interior ends (52, 62) of the sleeve (50) and piston (60). The axially extending portion (95) extends into a shoulder (97) for abutting a resilient spring (100) which engages at an opposite end a shoulder (57) of the sleeve (50).

16 Claims, 2 Drawing Sheets

COMPACT BRAKE PISTON-RETURN MECHANISM

The invention relates to a combination brake piston and return mechanism, particularly for use in aircraft brake assemblies.

Aircraft brake assemblies require automatic adjusters which compensate for brake wear in order to maintain the hydraulic brake fluid volume essentially constant during brake actuation. Prior automatic adjusters include tube adjusters which utilize a pressure plate assembly disposed between the adjuster and the stack of brake members. Such adjusters are disposed external to pistons, in their own separate bores, and engage the pressure plate assembly. Other automatic adjusters are combined with a piston wherein the piston is returned to the running clearance position against brake back pressure. Adjusters disposed internally of the pistons are provided for present-day hydraulic systems which operate at approximately 3,000 psi maximum brake pressure, although in cases where back pressure is high the design may be marginal because it is difficult to provide a large enough spring in the available space to overcome system back pressure.

Future aircraft systems will require much higher hydraulic brake pressures, such as in the order of 8,000 psi. Such pressures require smaller diameter pistons which preclude the use of internal automatic adjusters due to the lack of sufficient space inside the piston to enclose all of the adjuster parts. It is undesirable from a weight standpoint to revert back to using a pressure plate assembly and adjusters disposed externally of the piston, and therefore a need exists for an automatic adjuster disposed internally of the piston which will fit within the piston of a small diameter piston high pressure system. The present invention fills this need by providing a compact piston-return mechanism assembly, comprising a housing having a cylindrical bore, a longitudinal sleeve received fixedly within said bore and having a longitudinal through opening, a piston received within the through opening of the sleeve, the piston having an aperture in an end disposed within said bore, the aperture communicating with an interior opening within said piston, a deformable member disposed within said interior opening and connected with said piston, a deforming member received within said deformable member and extending through said aperture to an enlarged diameter member disposed at an end of the bore, the enlarged diameter member extending radially outwardly to an outer radial portion, and resilient means disposed between said outer radial portion and said sleeve, so that fluid pressure received within said bore biases said piston outwardly of said bore and engagement of the deformable member with the deforming member displacing said deforming member against said resilient means.

One way of carrying out the invention is described in detail below with reference to the drawings which illustrate an embodiment, in which.

Figure 1:
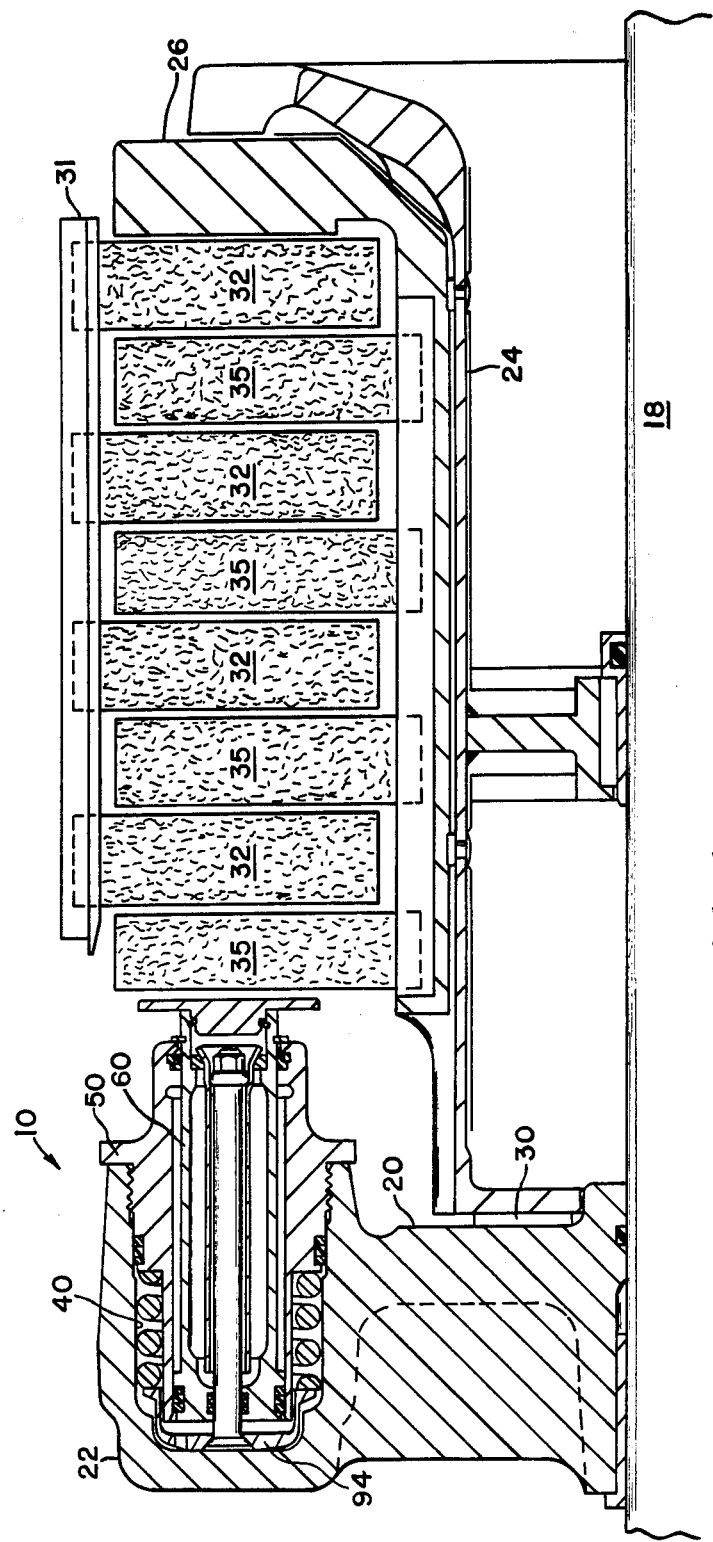
FIG. 1 is a sectional schematic representation of an aircraft wheel and disc brake assembly embodying the present invention.

The compact brake piston-return mechanism of the present invention is designated generally by reference numeral 10. An aircraft wheel (not shown) is suitably journalled on a rotatably fixed axle 18 carried by conventional aircraft landing gear structure (not shown). An annular brake carrier 20 suitably keyed to axle 18 is provided with a plurality of circumferentially spaced-apart housings 22, only one of which is shown, each suitably vented via a passage (not shown) to a source of pressurized fluid controlled by the aircraft pilot. A torque tube 24 having an integral backing plate 26 is secured fixedly to carrier 20 by a plurality of circumferentially spaced-apart bolts 30. A plurality of spaced-apart annular brake rotor members 32 are suitably keyed to a retaining member 31 comprising carbon-carbon composite rotors secured to the wheel and adapted to permit axial movement of the rotor members 32 relative to the wheel. A plurality of annular brake stator members 35 comprising carbon-carbon composite stators are suitably keyed for axial movement relative to torque tube 24. The rotor members 32 and stator members 35 are adapted to be actuated by a plurality of compact brake piston-return mechanisms 10. Upon energization of the mechanisms 10, the stators and rotors are compressed together to retard rotation of the wheel.

The housing 22 of the compact brake piston-return mechanism assembly 10 comprises bore 40 extending to an open end 42. Received within bore 40 is a longitudinal sleeve 50 which extends longitudinally within bore 40 to an interior end 52, sleeve 50 extending exteriorly of the bore to exterior end 51 and including a through opening 56 which slidably receives therein a piston 60. Piston 60 has an interior opening 66 and at interior piston end 62 a sealing means 64 which slidably engages the interior surface of opening 56. Interior opening 66 includes radially inward abutment 67 including shoulder 68 which provides a stop for ring 70. Ring 70 engages an end flange portion 82 of deformable member 80. Deformable member 80 extends longitudinally within interior opening 66 and includes therein a deforming member 90. The deforming memeber 90 extends longitudinally through deformable member 80 and through piston end aperture 63 located at piston end 62. Member 90 includes at one end a ball 92 affixed thereto by a nut 93 and at the other end a radially extending member or enlarged diameter member 94. Radially extending member 94 includes a through opening 97 for permitting fluid to flow therethrough. The deformable member 80 and deforming member 90 comprise a ball-and-tube adjuster which causes tube 80 to expand radially outwardly when the tube 80 is displaced relative to the rod 90 and ball 92. Radially extending member 94 extends radially outwardly of interior end 52 of sleeve 50 and extends axially through axially extending portion 95 in order to encircle the sleeve interior end 52 and piston end 62. Axially extending portion 95 extends radially outwardly into radially extending end 96 to provide shoulder 97 which abuts a resilient spring 100. Sleeve 50 includes an outer diameter section 55 and an inner reduced diameter section 54 which define therebetween shoulder 57 that is abutted by the other end of spring 100. Sleeve 50 includes a groove 58 including therein sealing means 65. Piston 60 extends axially outwardly of through opening 56 and includes an enlarged diameter portion 69 positioned adjacent the stack of rotors 32 and stators 35. Piston end 74 includes a stop ring 61 for limiting the inward axial movement of the piston relative to sleeve 50.

Figure 3:
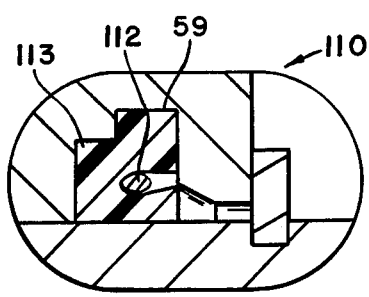
FIG. 3 is a section view of a spring and seal wiper mechanism of the disc brake assembly.

Sleeve end 51 includes a groove 59 which includes a therein a wiper mechanism 110 (see FIG. 3). Wiper mechanism 110 comprises a spring 112 disposed within a generally C-shaped seal 113. When the seal 113 and spring 112 are disposed within and compressed between groove 59 and the exterior surface of piston 60, spring 112 is squeezed radially so that it biases the seal 113 both radially inwardly and outwardly.

Figure 2:
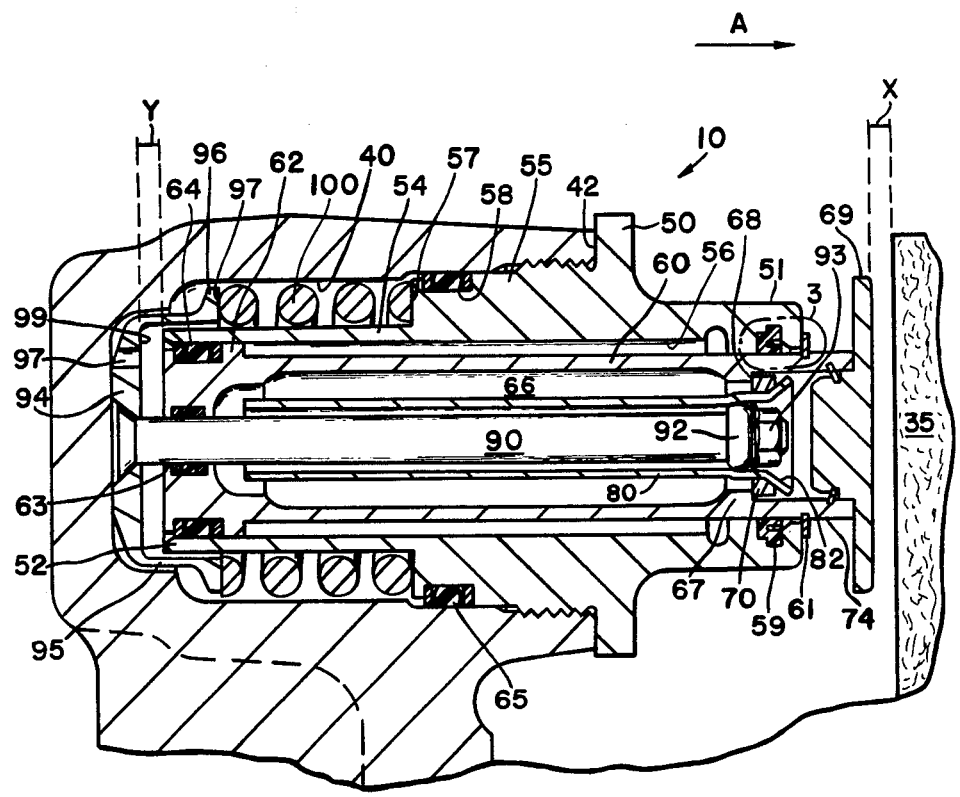
FIG. 2 is an enlarged sectional view of a portion of FIG. 1.

The present invention operates as follows during a typical braking actuation. When pressurized hydraulic brake fluid is introduced into bore 40 by the aircraft operator, the pressurized fluid acts against the end 62 of piston 60 to bias piston 60 axially outwardly of bore 56 and into contact with the brake stack. As piston 60 moves in the direction of Arrow A (see FIG. 2), ring 70 engaging flange 82 moves deformable member 80 along with piston 60. It should be noted that the distance X between the radially extending portion 69 and the stack of rotors and stators comprises a running clearance which corresponds approximately to the distance Y located between end 52 of sleeve 50 and an interior surface 99 of radially extending member 94. As piston 60 moves axially outwardly though the running clearance X, the piston displaces, by means of ring 70, deformable member 80, deforming member 90, and radially extending member 94 through the distance Y. Displacement of radially extending member 94 compresses spring 100 against shoulder 57. As the friction material of rotors 32 and stators 35 wears, piston 60 will extend further outwardly of through opening 56 and in doing so moves a distance greater than the running clearance defined by the individual distances X or Y, and causes tube 80 to be displaced relative to the ball 93 and rod 90 which are fixedly positioned relative to housing 22 once interior surface 99 engages end 52 of sleeve 50. Thus, as tube 80 is displaced axially relative to rod 90 and ball 93, the tube expands, and when the aircraft operator ceases actuation of the braking system, spring 100 biases the radially extending member 94 inwardly of bore 40 so that surface 99 moves away from sleeve end 52 to reestablish the running distance Y and the corresponding running clearance X.

The present invention solves the problems posed by the implementation of high pressure braking systems in aircraft. Because the spring and radially extending member of the deforming member are disposed exteriorily of the piston, a reduced diameter bore 56 may be provided and a reduced diameter piston may be utilized in order to provide higher braking pressures required for the system. By providing a ball and tube adjuster mechanism disposed interiorily of the piston, considerable size and weight savings are accomplished and the pressure plate utilized in external adjusters is eliminated.

Various modifications of the above-described embodiment of the invention will be apparent to those skilled in the art. It is to be understood that such modifications can be made without departing from the scope of the invention.

I claim:

1. A brake piston and return mechanism assembly, comprising:
   a housing having a cylindrical bore;
   a longitudinal sleeve received fixedly within said bore and having a longitudinal through opening;
   a piston received within a through opening of the sleeve;
   the piston having an aperture in an end disposed within said bore;
   the aperture communicating with an interior opening within said piston;
   a deformable member disposed within said interior opening and connected with said piston;
   a deforming member received within said deformable member and extending through said aperture to an enlarged diameter member disposed at an end of the bore;
   the enlarged diameter member extending radially outwardly to an outer radial portion; and
   resilient means disposed between said outer radial portion and said sleeve, so that fluid pressure received within said bore biases said piston outwardly of said bore and engagement of the deformable member with the deforming member displacing said outer radial portion against said resilient means.

2. The brake piston and return mechanism in accordance with claim 1, wherein the deformable member comprises a tube and the deforming member comprises a rod having a ball at an end thereof, movement of the deformable member relative to the deforming member causing said tube to expand as said ball moves therethrough.

3. The brake piston and return mechanism in accordance with claim 2, wherein said piston includes sealing means disposed between an outer portion of said piston and an inner surface of the through opening.

4. The brake piston and return mechanism in accordance with claim 3, wherein said piston includes an internal shoulder engaging a ring which provides a connection between said piston and deformable member.

5. The brake piston and return mechanism in accordance with claim 1, wherein said enlarged diameter member of the deforming member includes an opening for passage for fluid therethrough.

6. The brake piston and return mechanism in accordance with claim 5, wherein said sleeve includes a reduced diameter section and an outer diameter section defining therebetween a shoulder, the shoulder providing a stop for said resilient means.

7. The brake piston and return mechanism in accordance with claim 6, wherein said enlarged diameter member of the deforming member comprises a plate which extends radially outwardly of the reduced diameter section of the sleeve.

8. The brake piston and return mechanism in accordance with claim 7, wherein said plate extends axially relative to the sleeve to encompass a portion of the re-duced diameter section, and extends further radially out-wardly to provide a shoulder for abutment with said resilient means.

9. The brake portion and return mechanism in accordance with claim 1, wherein the enlarged diameter member is spaced-apart a distance from an end of said sleeve, the distance comprising a running clearance which corresponds to a clearance between the piston and a brake member engageable by the piston.

10. The brake piston and return mechanism in accordance with claim 1, wherein an exterior end of said sleeve disposed exteriorly of said bore includes a wiping seal disposed between said sleeve and an exterior surface of said piston.

11. A brake piston return mechanism assembly, comprising a housing having a cylindrical bore, longitudinal sleeve means disposed fixedly in the bore and having therein a through opeing, piston means disposed slidably within the through opening and extendig therefrom, and a deformable member connected with said piston means and receiving therein a deforming member, characterized in that the piston means comprises an interior opening receiving therein said deformable member and deforming member, the piston means having an aperture at an end disposed interiorly of the bore and through which the deforming member extends to a radially extending member, the sleeve means including an outer diameter section and a reduced diameter section defining therebetween a shoulder, and resilient means disposed between said shoulder and said radially extending member in order to bias the radially extending member axially inwardly of said bore.

12. The brake piston return mechanism assembly in accordance with claim 11, wherein an exterior end of said sleeve menas disposed exteriorly of said bore includes a wiping seal disposed between said sleeve means and an exterior surface of said piston means.

13. The brake piston return mechanism assembly in accordance with claim 11, wherein the radially extending member includes an outer radial portion which extends axially relative to the bore to encircle an end portion of said sleeve means and extends further radially outwardly to define a shoulder engaging said resilient means.

14. The brake piston return mechanism assembly in accordance with claim 13, wherein the deformable member comprises a tube connected by means of a ring with the piston means, the deforming member comprising a rod having a ball at an end thereof, movement of the deformable member relative to the deforming member causing said ball to expand said tube.

15. The brake piston return mechanism assembly in accordance with claim 14, wherein said piston means extends exteriorly of said through opening to an enlarged diameter end portion for engaging a braking member.

16. A brake piston return mechanism assembly, comprising a housing having a cylindrical bore, longitudinal sleeve means disposed fixedly in the bore and having therein a through opening, a piston disposed slidably within the through opening and extending therefrom, and an engagable member connected with said piston and frictionally contacting an engaging member, characterized in that the piston comprises an interior opening receiving therein said engagable member and engaging member, the piston having an aperture at an end disposed interiorly of the bore and through which the engaging member extends to a radially extending member, the sleeve means including an outer diameter section and a reduced diameter section defining therebetween a shoulder, and resilient means disposed between said shoulder and said radially extending member in order to bias the radially extending member axially inwardly of said bore.

* * * * *